US010634101B2

(12) United States Patent
Bartolotta et al.

(10) Patent No.: US 10,634,101 B2
(45) Date of Patent: Apr. 28, 2020

(54) EXHAUST GAS RECIRCULATION VALVE ACTUATOR DEVICE (EGR) IN AN INTERNAL COMBUSTION ENGINE AND RELATED EXHAUST GAS RECIRCULATION VALVE ASSEMBLY (71) Applicant: MAGNETI MARELLI S.p.A., Corbetta (IT)

(72) Inventors: Giancarlo Bartolotta, Corbetta (IT); Stefano Domma, Corbetta (IT); Matteo Avanzi, Corbetta (IT); Stefano Musolesi, Corbetta (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 15/632,975

(22) Filed: Jun. 26, 2017

(65) Prior Publication Data
US 2017/0370330 A1 Dec. 28, 2017

(30) Foreign Application Priority Data

Jun. 27, 2016 (IT) .................. 102016000066416

(51) Int. Cl.
*F02M 26/54* (2016.01)
*F02M 26/74* (2016.01)
(Continued)

(52) U.S. Cl.
CPC ............ *F02M 26/54* (2016.02); *F02M 26/48* (2016.02); *F02M 26/58* (2016.02); *F02M 26/67* (2016.02);
(Continued)

(58) Field of Classification Search
CPC ........ F02M 26/48; F02M 26/54; F02M 26/66; F02M 26/67; F02M 26/68; F02M 26/69; F02M 26/72; F02M 26/74
See application file for complete search history.

(56) References Cited

U.S. PATENT DOCUMENTS 5,718,259 A * 2/1998 Miyake ................. F16K 31/04
137/338
6,102,016 A 8/2000 Sitar et al.
(Continued)

FOREIGN PATENT DOCUMENTS

CN 201908748 U 7/2011
EP 1126156 A2 8/2001
(Continued)

OTHER PUBLICATIONS

Italian Search Report and Written Opinion for Italian Patent Application No. UA20164688 dated Mar. 17, 2017 (9 pages).

*Primary Examiner* — Kevin R Steckbauer
(74) *Attorney, Agent, or Firm* — Howard & Howard Attorneys PLLC (57) ABSTRACT Exhaust gas recirculation valve actuator device in an internal combustion engine, comprising an actuator body housing where the stem of an exhaust gas recirculation valve, extends along an axial direction. A motor acts to move the recirculation valve along the axial direction X-X, to pass from an open configuration to a closed configuration. A transmission is interposed between the motor and the exhaust gas recirculation valve. The device also includes support and guide mechanism and a sealing mechanism, in correspondence of a connection interface of the actuator body with an associable valve body, which houses an exhaust gas passage duct, wherein the actuator body is mechanically separable/connectable from/to said associable valve body.

15 Claims, 5 Drawing Sheets (51) Int. Cl.
*F16K 31/54* (2006.01)
*F16K 31/04* (2006.01)
*F02M 26/67* (2016.01)
*F02M 26/48* (2016.01)
*F02M 26/58* (2016.01)
*F02M 26/68* (2016.01)

(52) U.S. Cl.
CPC ............ *F02M 26/68* (2016.02); *F02M 26/74* (2016.02); *F16K 31/047* (2013.01); *F16K 31/54* (2013.01)

(56) References Cited

U.S. PATENT DOCUMENTS

| | | | | |
|---|---|---|---|---|
| 6,189,520 B1* | 2/2001 | Cook | ................. | F02M 25/0818 123/568.27 |
| 6,217,001 B1* | 4/2001 | Gluchowski | ........... | F02M 26/53 251/129.07 |
| 6,247,461 B1* | 6/2001 | Smith | .................... | F02M 26/69 123/568.2 |
| 6,382,195 B1* | 5/2002 | Green | .................... | F02M 26/48 123/568.23 |
| 6,435,169 B1 | 8/2002 | Vogt | | |
| 8,690,122 B2* | 4/2014 | Kato | ........................ | H02K 7/06 123/568.24 |
| 9,140,218 B2* | 9/2015 | Keefover | .......... | F16K 31/52408 |
| 9,587,592 B2* | 3/2017 | Keefover | .......... | F16K 31/52408 |
| 2002/0089327 A1* | 7/2002 | Spellman | .............. | G01D 5/145 324/207.21 |
| 2008/0295812 A1 | 12/2008 | Fujita et al. | | |
| 2010/0270486 A1* | 10/2010 | Kato | ....................... | F16K 31/04 251/129.12 |
| 2013/0167815 A1* | 7/2013 | Bareis | ..................... | F02D 9/106 123/568.24 |
| 2013/0269664 A1* | 10/2013 | Park | ..................... | F16K 31/528 123/568.29 |
| 2015/0159594 A1* | 6/2015 | Keefover | .......... | F16K 31/52408 251/249 |
| 2015/0159595 A1* | 6/2015 | Keefover | .......... | F16K 31/52408 123/568.24 |

FOREIGN PATENT DOCUMENTS

| | | | | |
|---|---|---|---|---|
| EP | 1126156 A3 | 6/2002 | | |
| EP | 2357350 A1 | 8/2011 | | |
| WO | 2006097884 A1 | 9/2006 | | |
| WO | WO 2006097884 A1 * | 9/2006 | ............. | F02M 26/54 |
| WO | WO-2006097884 A1 * | 9/2006 | ............. | F02M 26/54 |

* cited by examiner

EXHAUST GAS RECIRCULATION
EXHAUST GAS RECIRCULATION VALVE ACTUATOR DEVICE (EGR) IN AN INTERNAL COMBUSTION ENGINE AND RELATED EXHAUST GAS RECIRCULATION VALVE ASSEMBLY

CROSS-REFERENCE TO RELATED APPLICATIONS

The present application claims priority to and all the benefits of Italian Patent Application No. 102016000066416, filed on Jun. 27, 2016, which is hereby expressly incorporated herein by reference in its entirety.

BACKGROUND OF THE INVENTION

1. Field of the Invention

The present invention concerns an exhaust gas recirculation valve actuator device (EGR) in an internal combustion engine and the related exhaust gas recirculation valve assembly.

2. Description of the Related Art

As is known, exhaust gas combustion is never entirely complete in an internal combustion engine. In fact, the extreme variability of the engine's operating conditions, and therefore the extreme variability of the operating conditions of the combustion chamber of an internal combustion engine, make it very difficult, if not impossible, to always achieve an optimal combustion, that is, complete. It follows that exhaust gases, at least partially, contain partial combustion products, with particular reference to unburnt hydrocarbons. It should be noted that this condition refers to any type of internal combustion engine, with particular reference to internal combustion engines both in Otto cycle and diesel cycle.

These unburnt hydrocarbons inevitably result in an increase in engine fuel consumption, since they do not actively participate in the combustion process but are expelled to the atmosphere along with the exhaust gases and obviously result in an increase in pollutant emissions, specifically because partially burned substances are introduced into the atmosphere.

For all these reasons, it is known to recirculate, i.e., re-introduce in aspiration of the combustion chamber, at least in part, said exhaust gases containing unburnt hydrocarbons. In this way, unburnt hydrocarbons may re-enter the combustion chamber and participate in the combustion process: in this way, a reduction both in fuel consumption and in pollutant emissions is achieved. The known solutions include the use of specific exhaust gas recirculation valves, so-called EGR valves, which intercept the flow of exhaust gases leaving the combustion chamber and re-introduce them at least partially into the aspiration of the engine. These valves are extremely delicate components and often subject to jams and malfunctions. In fact, it should be noted that the exhaust gases hitting said EGR valves are highly corrosive as they contain, on one hand, pollutants, such as unburnt hydrocarbons, and, on the other, are constituted of extremely high temperature gases, on the order of hundreds of degrees Celsius.

In the specific case of diesel cycle engines, such unburnt gases also tend to immobilize these EGR valves with the formation of deposits that stick to the stem and/or mushroom of the EGR valve and, in time, affect operation of the same, reducing the usefulness of the exhaust gas flow and/or causing the seizure, i.e. blocking of the EGR valve.

Further technical problems are associated with the positioning and implementation of said exhaust gas recirculation valve. For example, the valve's actuators must be protected as much as possible from the very high temperatures of the exhaust gases passing through the valve; in other words, it is necessary to cause an efficient heat reduction between the exhaust gases and the motor means of the valve. Moreover, the exhaust gas recirculation valve and its actuator are subjected to considerable mechanical stresses due essentially to the high vibrations transmitted by the motor and amplified in terms of pressure cycles due also to the same exhaust gas flow.

Such thermal and mechanical stresses, combined with each other, create a particularly difficult operating condition for the exhaust gas recirculation valve component.

In addition, increasingly stringent anti-pollution legislation imposes more and more control laws on the opening/closing laws of the recirculation valve: in other words, in order to ensure compliance with legal parameters, the valve always needs to ensure a precise degree of opening and therefore a precise volume of exhaust gas recirculation in the various operating conditions of the engine. This requirement presupposes not only a specific control valve actuation strategy, but also a constructive architecture and a kinematic valve drive chain that ensure the exact implementation of the opening/closing law imposed by valve management software. In addition, in order to comply with stringent anti-pollution regulations, a recirculation valve must be provided to ensure correct execution of the opening law imposed by the software over time, i.e. after thousands of hours of operation, avoiding that the possible disposal or dirtying of the valve and/or its kinematic system can affect its proper functioning with respect to its theoretical opening/closing law. In fact, a modification of only a few millimeters between the degree of theoretically imposed opening of the software and the real degree obtained through Kinematics can drastically reduce the effectiveness of the recirculation valve by penalizing the performance of the engine and by considerably increasing pollutant emissions and/or fuel consumption.

Furthermore, a non-closing, i.e. a prolonged opening of the valve itself, can result in a rapid dirtying, if not a real damage and burn of the valve itself.

In light of the above, it is concluded that the design, positioning and control of the EGR-type valve is extremely delicate. Finally, it should be added that in light of increasingly stringent regulations on emissions of pollutants, and in light of the increasingly pressing demands on users to reduce fuel consumption, this type of component has been used more and more in engines, becoming, in the past few years, a virtually indispensable component in the latest generation of engines. For this reason, the need is also felt to provide an exhaust gas recirculation valve that may be placed on a pre-existing engine, as an add-on or retrofitting. By pre-existing engine, it is not necessarily intended that the valve is to be added to an engine already in use, but rather the possibility is intended also to equip an engine already designed with said valve without necessarily altering the design, or altering it in a minimally invasive manner, in order to reduce design costs as much as possible.

SUMMARY OF THE INVENTION

The solutions of exhaust gas recirculation valves present in the art cannot, to date, fully satisfy the aforementioned requirements.

The need for resolving the disadvantages and limitations cited with reference to the known art is therefore felt.

This requirement is satisfied by an exhaust gas recirculation valve actuator device in an internal combustion engine, comprising an actuator body housing a stem of an exhaust gas recirculation valve, extending along an axial direction. A motor of the exhaust gas recirculation valve moves the exhaust gas recirculation valve along the axial direction, to pass from an open configuration to a closed configuration, a transmission is interposed between the motor and the exhaust gas recirculation valve. The actuator device further includes support and guide mechanism of the exhaust gas recirculation valve, as well as a heat reducing and sealing mechanism, in correspondence of a connection interface of the actuator body with an associable valve body, which houses an exhaust gas passage duct. The actuator body is mechanically separable from said associable valve body. The stem of exhaust gas recirculation valve is made of a single integral piece with a closure valve head or poppet of the same valve. The actuator device comprises a contactless position sensor, facing a portion of said stem provided with an emissive element, so as to detect its axial position. The contactless position sensor is housed in the actuator body. The present invention is also directed toward an exhaust gas recirculation valve assembly having an exhaust gas recirculation valve actuator device as described above and further including a valve body associated to said actuator device. The valve body houses a closure head or poppet of the exhaust gas recirculation valve and an exhaust gas passage duct, intercepted by the closure head or poppet of the exhaust gas recirculation valve.

BRIEF DESCRIPTION OF THE DRAWINGS

Further features and advantages of the present invention will become more understandable from the following description of its preferred and non-limiting embodiments, wherein.

Figure 1:
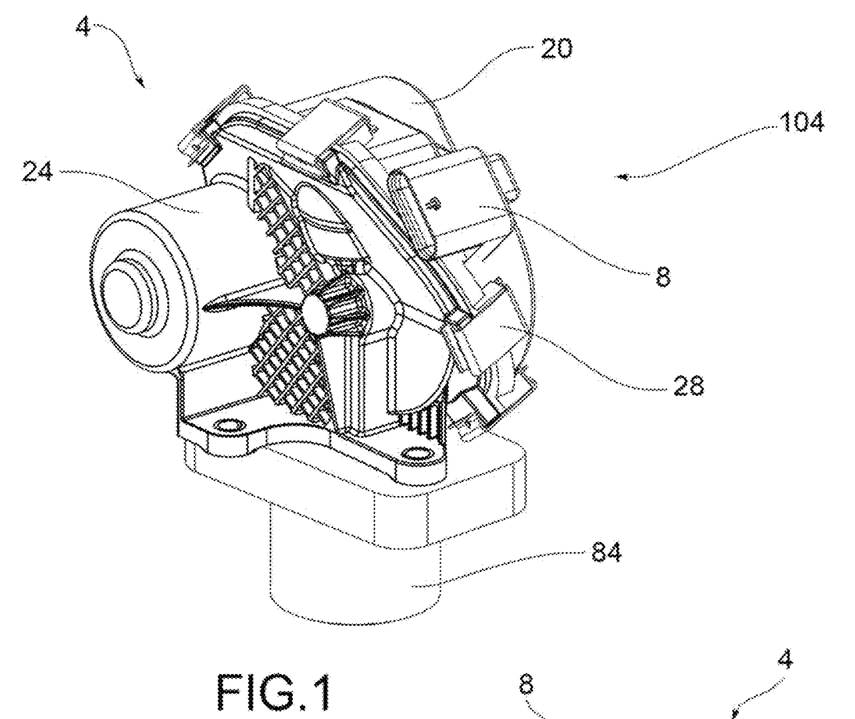
FIG. 1 is a perspective view of one angle of an exhaust gas recirculation valve assembly comprising an exhaust gas recirculation valve actuator device according to the present invention.
Figure 2:
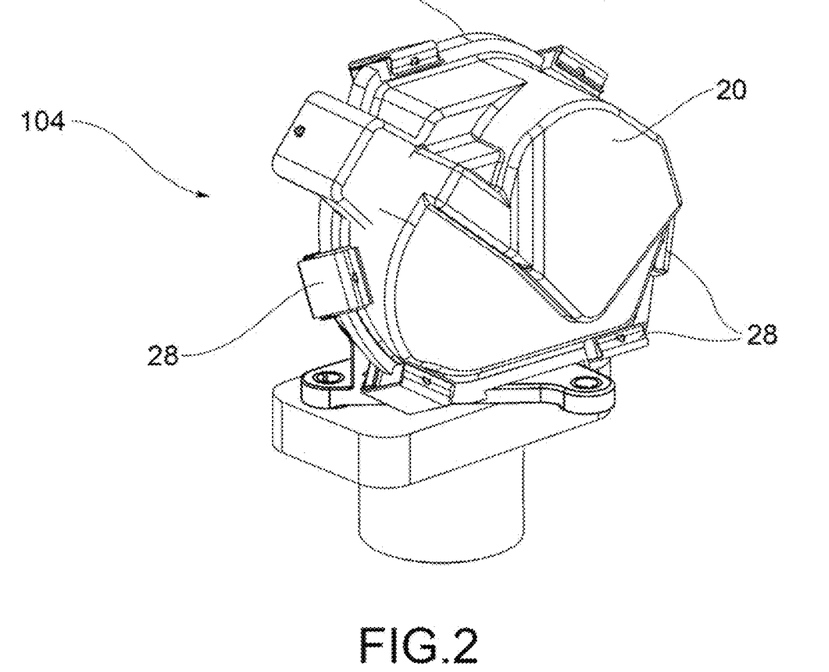
FIG. 2 is a perspective view of another angle of an exhaust gas recirculation valve assembly comprising an exhaust gas recirculation valve actuator device according to the present invention.
Figure 3:
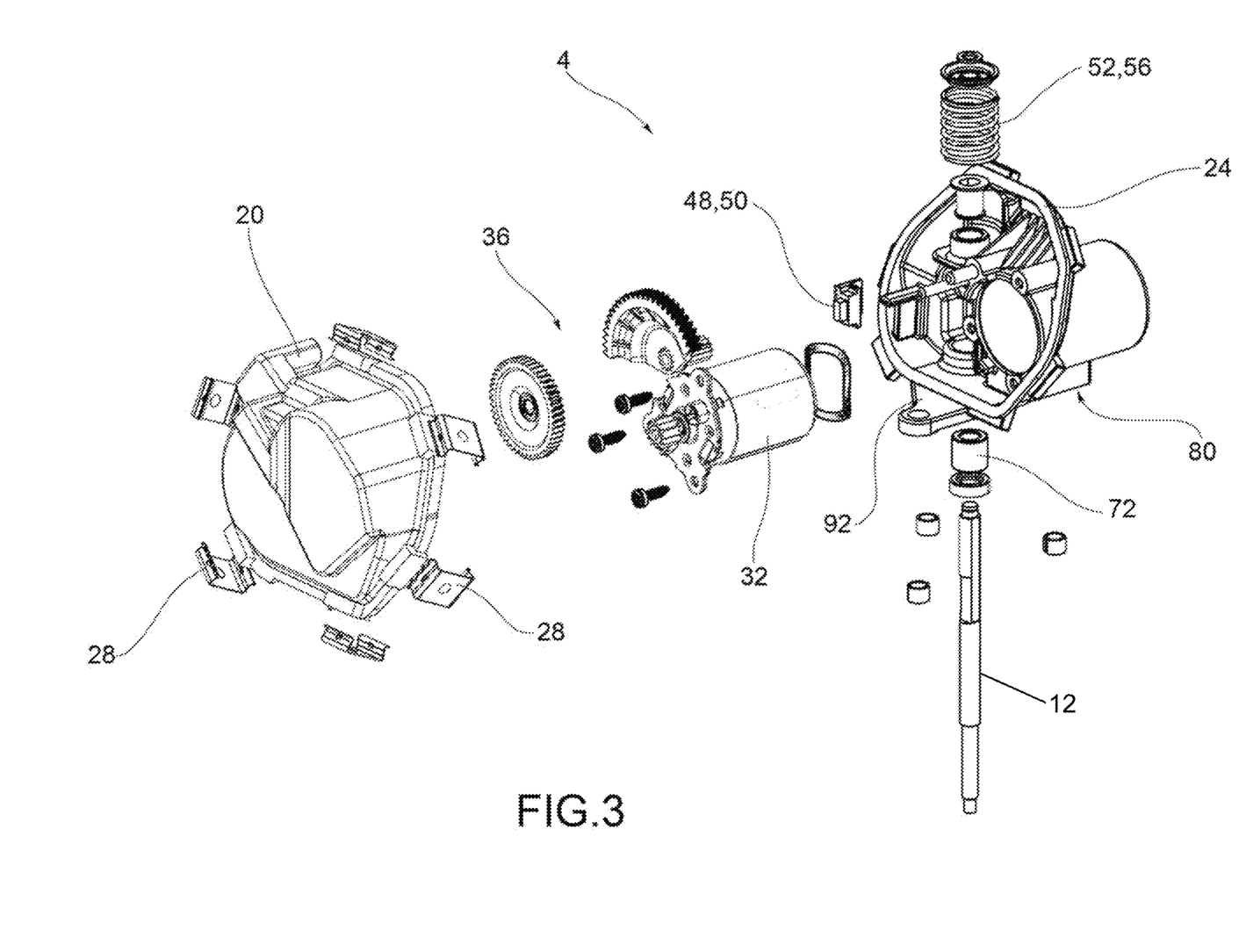
FIG. 3 is a perspective view, in separate parts, of the exhaust gas recirculation valve assembly of FIG. 1.
Figure 4:
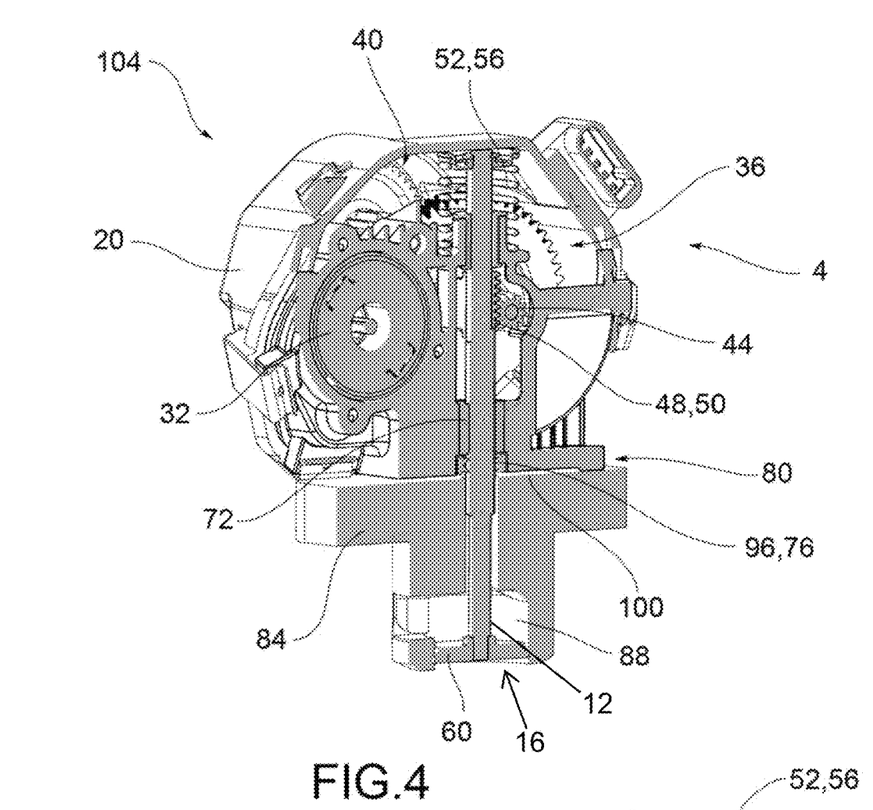
FIG. 4 is a perspective sectional view of the exhaust gas recirculation valve assembly of FIG. 1.
Figure 5:
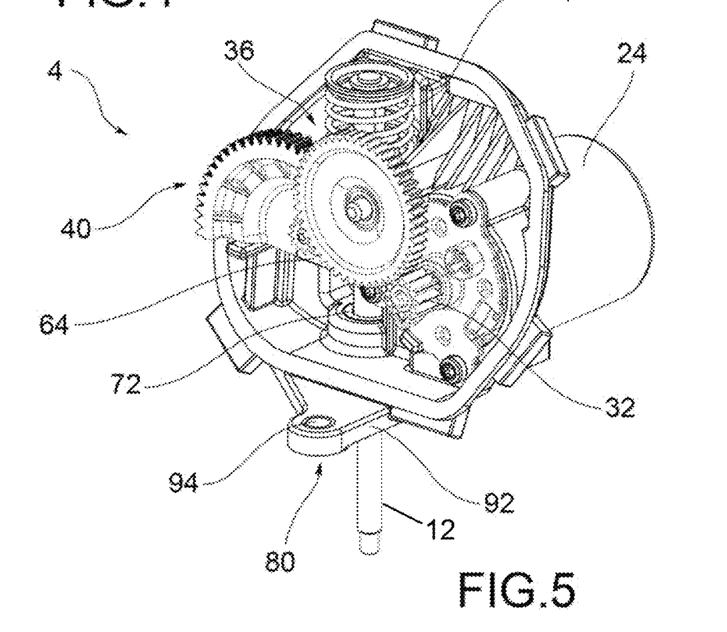
FIG. 5 is a perspective view of an exhaust gas recirculation valve actuator device, wherein a cover has been omitted to allow the view of some internal details of said device.
Figure 6:
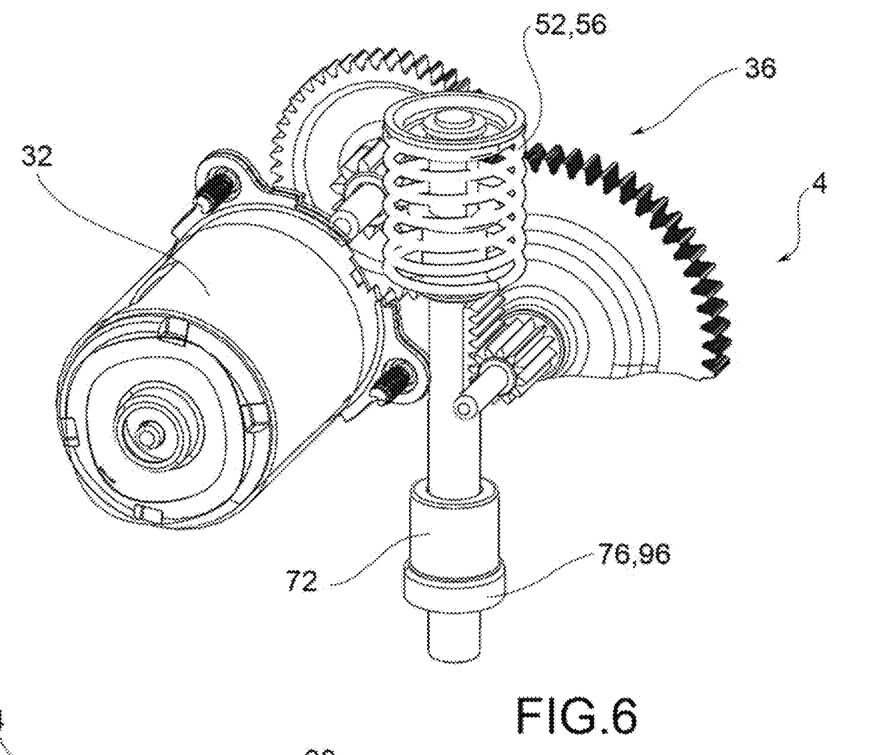
FIG. 6 is a partial sectional perspective view of an exhaust gas recirculation valve assembly according to the present invention.
Figure 7:
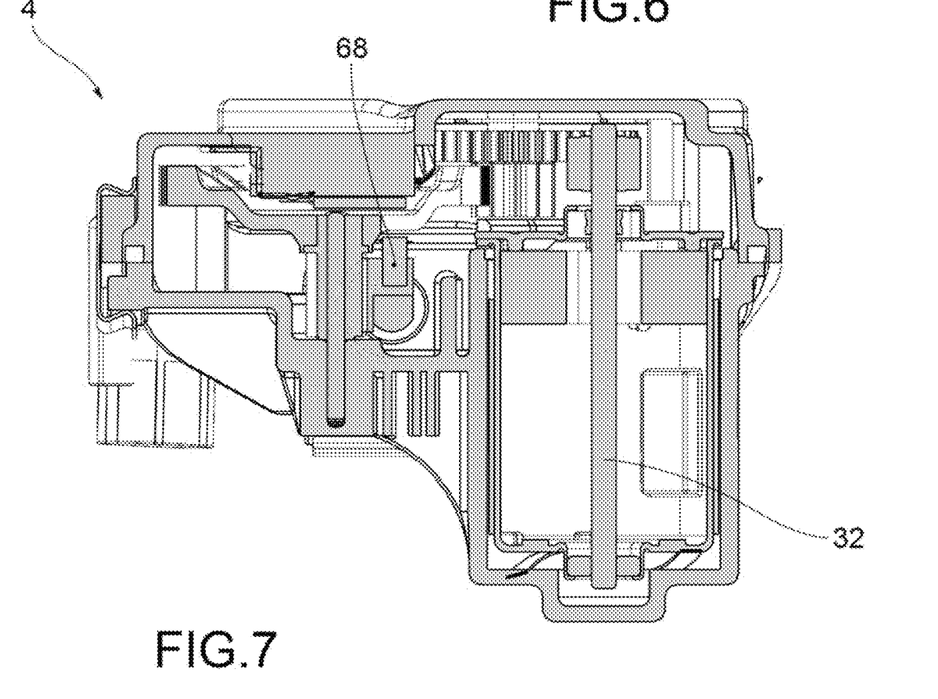
FIG. 7 is a sectional view of the exhaust gas recirculation valve actuator device of FIG. 6.
Figure 8:
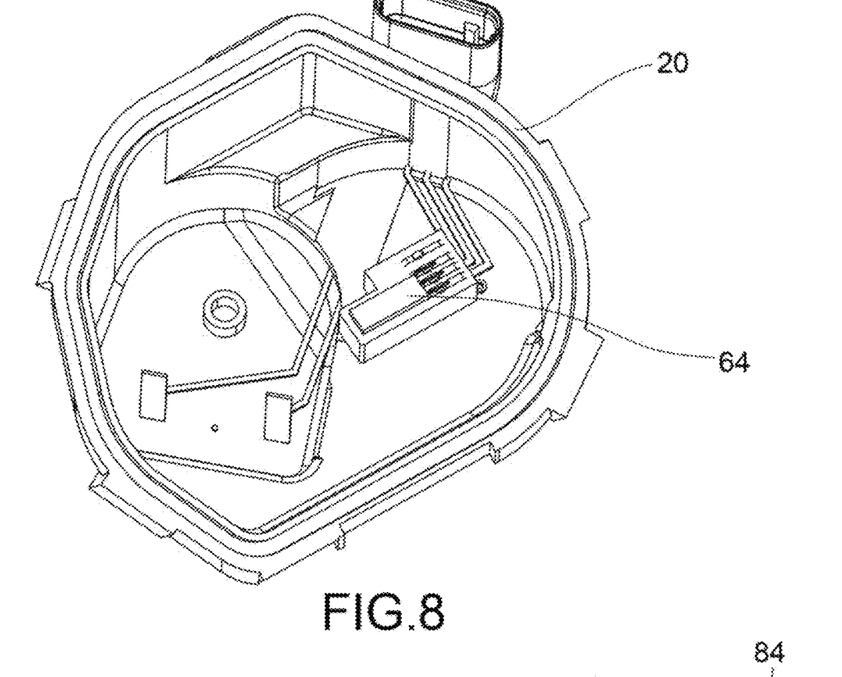
FIG. 8 is a perspective view of a cover of an actuator body of an exhaust gas recirculation valve actuator device according to the present invention.
Figure 9:
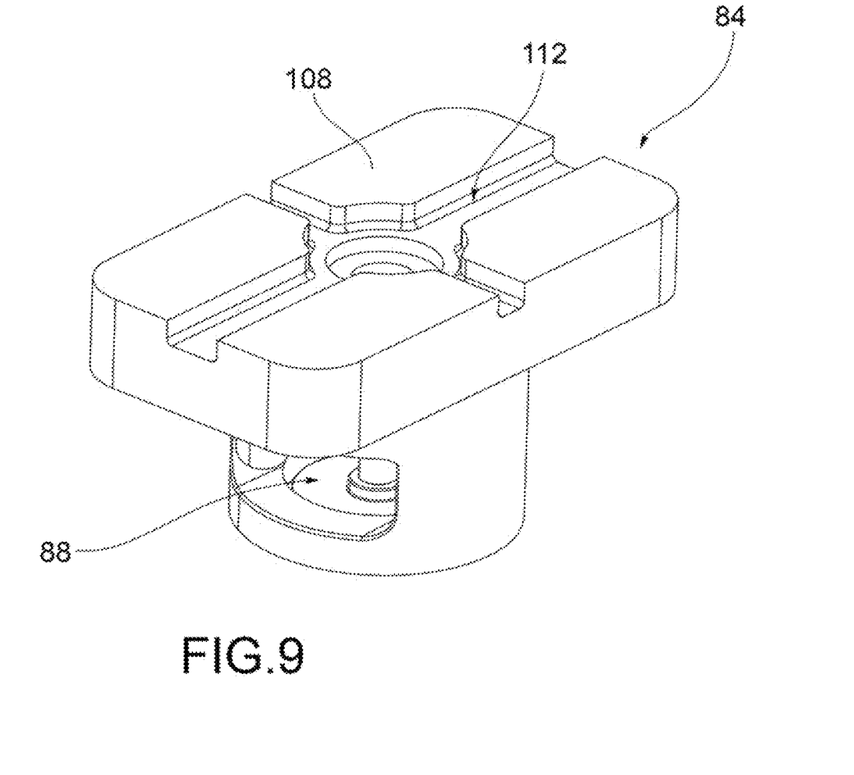
FIG. 9 is a perspective view of a valve body associable with an exhaust gas recirculation valve actuator device according to an embodiment of the present invention.

The elements or parts of elements in common between the embodiments described hereinafter will be indicated by the same numerical references.

DETAILED DESCRIPTION OF THE INVENTION

With reference to the aforementioned figures, 104 indicates collectively a schematic view of an exhaust gas recirculation valve (EGR) assembly in an internal combustion engine comprising an exhaust gas recirculation valve actuator device 4 and a valve body 84.

For the purposes of the present invention, the type of internal combustion engine on which said exhaust gas recirculation actuator device may be implemented is not indicated, meaning any type of internal combustion engine, both in the Otto cycle and in the diesel cycle.

Said actuator device 4 comprises an actuator body 8 which houses the stem 12 of an exhaust gas recirculation valve 16 extending along an axial direction X-X. The stem 12 of exhaust gas recirculation valve 16 is made of a single integral piece with a closure valve head or poppet 60 of the same valve.

Preferably, the actuator body 8 is made in at least two parts or shells 20, 24 which may be joined together. According to one possible embodiment, said parts or shells 20, 24 may be removably joined by removable fasteners such as screws, pins or elastic staples 28, and the like.

In one embodiment, the actuator body 8 is made of plastic material or any other material suitable for reducing heat, as further described below.

At the same time, the material of the shells 20, 24 must provide the necessary mechanical resistance to vibrations, dimensional stability and characteristics throughout the temperature range, of applied loads and other design and/or functional constraints, in an effort to contain as much as possible the mass of the actuator device 4.

The actuator body 8 houses internally a motor 32 of the exhaust gas recirculation valve 16 that moves the recirculation valve 16 along said axial direction X-X, to pass from an open configuration to a closed configuration.

In one embodiment, the motor 32 may include a rotary electric motor powered by direct current.

The actuator body 8 also houses a transmission 36 disposed between the motor 32 and the exhaust gas recirculation valve 16 and houses the support and guide mechanism 40 of the exhaust gas recirculation valve 16.

The transmission 36 includes mechanisms that transform of the rotary motion of the rotary electric motor into alternating rectilinear motion of the stem 12 of the exhaust gas recirculation valve 16.

According to one possible embodiment, said transmission 36 may include a pinion 44, kinematically connected to the motor 32, and a rack 48 fastened to the stem 12, provided with teeth 50, wherein the rack 48 engages with the pinion 44.

According to one embodiment, the teeth 50 of the rack 48 have a transversal width greater than the diameter of the stem 12 of the exhaust gas recirculation valve 16.

According to one embodiment, the motor 32 and the pinion 44 may be arranged opposite to the stem 12 provided with the rack 48: this results in a better concentration of the mass displaced within the actuator body 8 and a positioning of the center of mass near the actuator attachment points on the valve body 84.

The transmission 36 includes an elastic return mechanism 52 housed inside the actuator body 8.

According to one embodiment, said elastic return mechanism 52 includes a spring 56 coaxially positioned on the stem 12, opposite to a closure head or poppet 60 of the exhaust gas recirculation valve 16 inside the actuator body 8.

Preferably, the spring 56 is positioned so as to work in compression, pre-loading the exhaust gas recirculation valve 16 in closing and opposing the opening action exerted by the motor 32.

According to one embodiment, the spring 56 is a variable-pitch spring and/or has a nonlinear operating characteristic so as to exert a variable elastic return force as a function of its degree of compression.

Advantageously, the spring 56 is housed in a distal position relative to the closure head or poppet 60 of the exhaust gas recirculation valve 16. In this way, the spring 56 benefits as much as possible from the heat reduction caused by the actuator body 8 so as to provide an elastic return force that does not depend on the operating temperature of the exhaust gases from the relative internal combustion engine.

In addition, the positioning of the spring 56 in proximity to the motor 32 contributes to a better concentration of the mass contained within the actuator body 8.

According to one embodiment, the actuator device 4 includes a contactless position sensor 64 facing a portion of said stem 12 provided with an emissive element 68, such as a magnet, so as to indicate its axial position; said contactless sensor 64 is also housed in the actuator body 8, preferably in proximity to the elastic return mechanism 52.

For example, the contactless position sensor 64 may be a Hall effect sensor, a magneto-resistive sensor, or the like.

Advantageously, the sensor 64 is positioned so that it may directly read the position of the last element of the kinematic chain, reducing losses and improving the component's precision and reliability. Also in this case, on the one hand, the position sensor 64 is positioned in a position as distal as possible from the associable valve body, which radiates a considerable thermal flux that could affect the operation of the sensor itself; on the other hand, said position sensor 64 contributes to a better concentration of the mass contained within the actuator body 8. In any case, the positioning of the position sensor 64 and the emissive element 68 within the actuator body 8 improves the distribution and therefore the concentration of the masses and contributes to the overall reduction of the dimensions of the exhaust gas recirculation valve 16.

In one embodiment, the contactless position sensor 64 and the motor 32 are positioned opposite to the stem 12 of the exhaust gas recirculation valve 16. Also in this case, such positioning contributes to a better concentration of the mass contained within the actuator body 8.

The support and guide mechanism 40 of the exhaust gas recirculation valve 16 comprises at least one anti-friction bushing 72 which houses and drives the stem 12 coaxially to it, housed inside the actuator body 8.

The positioning of the anti-friction bushing 72 inside the actuator body 8 allows the bushing to benefit from the same heat reduction caused by the actuator body 8. In this way, the friction force opposed to the sliding of the stem relative to its anti-friction bushing 72 does not vary as the operating temperature of the exhaust gas of the related internal combustion engine varies.

According to a possible embodiment, the actuator device 4 may include a combined sealing and heat reducing mechanism 76 positioned at a connection interface 80 of the actuator body 8 with an associable valve body 84.

The valve body 84 houses an exhaust gas passage duct 88 as well as the closure head or poppet 60 of the exhaust gas recirculation valve 16 suitable to intercept the exhaust gases by allowing or inhibiting their recirculation in the combustion chamber of the associable internal combustion engine, in a known manner.

Advantageously, the actuator body 8 is mechanically separable/couplable from/to said associable valve body 84.

For example, the actuator body 8 comprises one or more bushings 92 provided with respective holes 94 for inserting threaded connections between the actuator body 8 and the valve body 84.

Typically, the valve body is made of metallic material, having to withstand temperatures of hundreds of degrees Celsius. The actuator body 8, as seen, is preferably in material other than the valve body material 84, so as to limit as much as possible the heat exchange between them. Preferably, the material of the actuator body 8 is a thermally insulating material, such as a plastic material.

The actuator device 4 of the exhaust gas recirculation valve 16 includes, as a combined sealing and heat reducing mechanism 76 for insulating from pollutants or external agents at the connection interface 80 of the actuator body 8 with the associable valve body 84, at least one gasket 96, positioned coaxially on the stem 12 of the exhaust gas recirculation valve 16.

According to one possible embodiment, the connection interface 80 of the actuator body 8 comprises a perimeter seat or recess 100, suitable to create an expansion chamber or escape route for exhaust gases coming from the associable valve body 84, and to reduce the contact surface between the connection interface 80 and the associable valve body 84.

The combination of the actuator body 8 and its valve body 84 constitutes an exhaust gas recirculation valve assembly 104.

According to one embodiment, the valve body 84, in correspondence with an upper face 108, facing the connection interface 80 of the actuator body 8, comprises a recess 112 that creates an exhaust gas vent channel, said vent channel being aligned, at least partially, with a perimeter seat or recess 100 formed on the connection interface 80 of the device body 8.

As may be appreciated from the foregoing, the exhaust gas recirculation (EGR) valve actuator device and its exhaust gas recirculation valve assembly according to the invention allow the disadvantages presented in the prior art to be overcome.

Advantageously, the actuator according to the present invention is made separate from the valve body: in this way, one may achieve the standardization of the actuation part, which is usable for other applications. The actuator construction and assembly process is simplified; it is possible to vary the orientation of the actuator to avoid possible constraints stemming from the application layout, and there is also the possibility of using plastic for making the actuator body, with a relative reduction of weight and component costs.

In addition, with the realization of the present invention, it is possible to obtain a better seal against contaminants coming from the side of the valve body, as well as a kinematic protection of the valve.

Moreover, advantageously, the valve's rebound or return spring, integrated in the actuator part, is positioned on the final post and is generally located in a distal position relative to the body of the valve, so as to benefit from the heat reduction and ensure the best clearance recovery, positioning precision, and component reliability.

Due to the heat reduction, the characteristic curve of the spring does not change over time and in operation, so as not to vary the elastic return force of the spring. It is important that this return force is as constant as possible over time and in all the operating conditions of the valve, since a variation of the return force could change the parameters for opening/closing the valve at the same command of the motor. Thus, it is possible to achieve greater compactness of the valve assembly due to the possibility of making the valve body without a return spring. In this way, it is possible to obtain a greater cooling efficiency of the valve body which is more compact than the solutions of the prior art. As seen above, cooling the valve body is essential for the purposes of heat reduction of the actuator body and therefore of the correct, durable and reliable operation of the exhaust gas recirculation valve assembly. Advantageously, as seen, the stem of the exhaust gas recirculation valve is made in a single piece, integral with the valve closing head or poppet, thus avoiding the inevitable additional clearances of the known art solutions wherein the valve stem is divided into two or more parts. In fact, multiple series trunks, associated with each other, create inevitable clearances between the contact portions of two adjacent trunks, in series, with each other. In addition, such clearances may increase or otherwise change uncontrollably as a result of the stresses and consequent thermal expansion of the valve components. Instead, the one-piece design according to the present invention avoids the presence of uncontrolled clearances and allows a more accurate control of the position of the single stem and, consequently, of the closure head by the motor and transmission.

Advantageously, the solution of the present invention provides effective recovery of clearances, and a greater guarantee of return of the valve under emergency conditions. For example, the use of a single post, or part, with the valve allows a clear recovery of clearances both in the opening command and in the closing command. In particular, the use, if needed, of a rack made on a plate assembled on the post on one hand simplifies the valve construction and assembly process and on the other guarantees greater resistance, as it increases the contact surface between the transmission teeth with respect to the size available by the diameter of the stem or shank of the valve (i.e. the same as the latter). Also, advantageously, the elastic return mechanism is positioned on the last stage of the recirculation valve actuation, i.e. they act directly on a portion of the valve stem, on the opposite side to the motor. In this way, the entire kinematics of the transmission is kept stressed, and it avoids the occurrence of possible vibrations that would be detrimental to the mechanical point of view, as well as annoying to the users.

Moreover, the use of a contactless sensor ensures functionality with low cost and greater reliability. In addition, said sensor is also housed in the actuator body and benefits from the heat reduction that preserves its functionality and durability. Furthermore, the actuator device according to the invention comprises a contact-less position sensor facing a portion of the valve rod provided with an emissive element, so as to detect its axial position. This configuration involves a number of advantages. In fact, the contact-less position sensor avoids possible imprecise readings/detections due to abnormal thermal expansion of the various components, which instead occur in solutions with contact sensors with push or contact pins.

Also, the emissive element is integrated in the valve stem and therefore does not in turn have additional possible clearances due to thermal expansion. Therefore the detection of the position of the recirculation valve is not done by mechanical contact but by a contact-less sensor.

Advantageously, the actuator of the present invention is suitable for a valve configuration of the "push-open" type, i.e. with a closing position toward the top. This means that the opening of the valve takes place following the thrust exerted by the actuator so as to overcome the elastic opposition from the spring: this architecture guarantees greater reliability and safety, as it is a better guarantee of the gas seal in the closed position. In addition, if the actuator malfunctions, the spring guarantees the closing of the valve itself. It should be noted, in fact, that, in the event of malfunction of the control of the exhaust gas recirculation valve, it is certainly preferable that the same, in the recovery condition, goes into the closed position so as not to recirculate the gases. In fact, over-recirculation or simply circulation that is poorly controlled or out-of-phase with the engine's operating conditions could lead to absolutely irregular engine operation with a likely increase in pollutant emissions and loss of performance by the engine; moreover, in extreme cases, the engine may also not start. In other words, in case of malfunction, it is preferable that the system self-excludes, that is, the valve closes so as not to recirculate the exhaust gases.

Advantageously, the post or stem supports are both on the side of the actuator body and this housing. In this way, on the one hand it is possible to compact the valve body and therefore to standardize the actuator, and on the other allows the post supports to work in conditions of reduced thermal stress since they are housed in the actuator body which benefits from heat reduction relative to the valve body. Moreover, better performance is achieved, since, if the bushing is housed in the valve body, it would be much more thermally stressed and would also tend to encrust over time.

Moreover, the groove positioned at the base of the actuator body in the interface zone with the valve body is able to release any gases coming from the valve body to prevent them from stressing the actuator gasket, which is further protected.

From a mechanical standpoint, with particular reference to the containment of vibrations which, as seen, represent significant stress to which the exhaust gas recirculation valve is subjected, it should be noted that the configuration of the valve according to the present invention allows such vibrations to be contained, due to a proper concentration of the mass of its internal components, relative to its center of gravity.

In particular, the drive motor of the valve is arranged in a position adjacent to the valve post, as well as to the flange. Moreover, the contactless sensor is also arranged near said center of gravity. In this way, due to a better position of the center of mass, the mechanical stresses are considerably reduced and therefore the vibration resistance increases.

Finally, said contactless sensor, due to its barycentric position in the actuator, is less exposed to external electromagnetic disturbances.

A person skilled in the art, in the object of satisfying contingent and specific requirements, may make numerous modifications and variations to the actuator devices and valve assemblies described above, all of which are within the scope of the invention as defined by the following claims.

The invention claimed is:

1. An exhaust gas recirculation valve device in an internal combustion engine, comprising a valve body, and an actuator body housing a stem of an exhaust gas recirculation valve, extending along an axial direction, a motor of said exhaust gas recirculation valve that moves the exhaust gas recirculation valve along said axial direction, to pass from an open configuration to a closed configuration, a transmission, interposed between the motor and the exhaust gas recirculation valve, a support and guide mechanism of the exhaust gas recirculation valve, a heat reducing and sealing mechanism, in correspondence with a connection interface of the actuator body which is in contact with the valve body, which houses an exhaust gas passage duct, wherein the actuator body is mechanically separable from said valve body, wherein the stem of exhaust gas recirculation valve is made of a single integral piece with a closure valve head or poppet of the same valve, wherein the actuator device comprises a contactless position sensor, facing a portion of said stem provided with an emissive element, so as to detect its axial position, said contactless position sensor being housed in the actuator body; and wherein said connection interface of the actuator body comprises a recess which forms an expansion chamber or escape route for leaking exhaust gases coming from the valve body and reduces a contact surface between the connection interface and the valve body.

2. The exhaust gas recirculation valve device as set forth in claim 1, wherein said emissive element is a magnetic element.

3. The exhaust gas recirculation valve device as set forth in claim 1, wherein the motor includes a rotary electric motor, and the transmission includes mechanisms that transform rotary motion of the rotary electric motor into reciprocating rectilinear motion of the stem of the exhaust gas recirculation valve, said transmission including a pinion, kinematically connected to the motor and a rack fixed to the stem, the rack meshing with said pinion.

4. The exhaust gas recirculation valve device as set forth in claim 3, wherein the motor and the pinion are arranged on opposite sides with respect to the stem provided with the rack.

5. The exhaust gas recirculation valve device as set forth in claim 1, wherein the transmission includes an elastic return mechanism, housed inside the actuator body.

6. The exhaust gas recirculation valve device as set forth in claim 5, wherein said elastic return mechanism includes a spring, arranged coaxially to the stem, on the side opposite the closure head or poppet of the exhaust gas recirculation valve, inside the actuator body.

7. The exhaust gas recirculation valve device as set forth in claim 6, wherein the spring is arranged so as to work in compression, pre-loading the exhaust gas recirculation valve in closing and opposing the opening action exerted by the motor.

8. The exhaust gas recirculation valve device as set forth in claim 6, wherein the spring exerts an elastic return force that varies as a function of its degree of compression.

9. The exhaust gas recirculation valve device as set forth in claim 5, wherein the elastic return mechanism is positioned so as to influence directly a portion of the stem of the valve itself, on an opposite end from the closure valve head or poppet.

10. The exhaust gas recirculation valve device as set forth in claim 1, wherein the contactless sensor and the motor are positioned on opposite sides with respect to the stem of the exhaust gas recirculation valve.

11. The exhaust gas recirculation valve device as set forth in claim 1, wherein the actuator body is made of plastic material.

12. The exhaust gas recirculation valve device as set forth in claim 1, wherein the support and guide mechanism of the exhaust gas recirculation valve comprises at least one anti-friction bushing that houses and guides the stem coaxially to it, housed in the actuator body.

13. The exhaust gas recirculation valve device as set forth in claim 1, wherein the heat reducing and sealing mechanism, in correspondence with the connection interface of the actuator body which is in contact with the valve body, comprises at least one gasket, arranged coaxially to the stem of the exhaust gas recirculation valve.

14. The exhaust gas recirculation valve device as set forth in claim 1,
wherein the valve body houses the closure head or the poppet of said exhaust gas recirculation valve and houses the exhaust gas passage duct, intercepted by said closure head or poppet of the exhaust gas recirculation valve.

15. The exhaust gas recirculation valve device as set forth in claim 14, wherein the valve body, in correspondence with an upper face, facing the connection interface of the actuator body, comprises a recess that creates an exhaust gas vent channel, said vent channel being aligned, at least partially, with the recess formed on the connection interface of the actuator body.

* * * * *